(12) United States Patent
Vogel

(10) Patent No.: US 10,390,645 B2
(45) Date of Patent: Aug. 27, 2019

(54) BOTTLE STORAGE BRACKET

(71) Applicant: Glenn Vogel, Evergreen, CO (US)

(72) Inventor: Glenn Vogel, Evergreen, CO (US)

(73) Assignee: Glenn Vogel, Evergreen, CO (US)

( * ) Notice: Subject to any disclaimer, the term of this patent is extended or adjusted under 35 U.S.C. 154(b) by 0 days.

(21) Appl. No.: 15/249,043

(22) Filed: Aug. 26, 2016

(65) Prior Publication Data

US 2018/0055262 A1 Mar. 1, 2018

(51) Int. Cl.
*A61J 9/00* (2006.01)
*A61J 9/06* (2006.01)
*F16M 13/02* (2006.01)
*A47G 23/02* (2006.01)
*A47B 73/00* (2006.01)

(52) U.S. Cl.
CPC ......... *A47G 23/0241* (2013.01); *F16M 13/02* (2013.01); *A47B 73/00* (2013.01); *A61J 9/00* (2013.01); *A61J 9/06* (2013.01)

(58) Field of Classification Search
CPC .... A47G 23/0241; F16M 13/02; A62C 13/78; A61J 9/06; A61J 9/00
USPC .... 248/102, 103, 113, 310, 312, 313, 316.7, 248/207, 309.1, 311.2, 682; 224/148.7, 224/414, 425, 914
See application file for complete search history.

(56) References Cited

U.S. PATENT DOCUMENTS

| | | | | |
|---|---|---|---|---|
| 1,349,051 A | * | 8/1920 | Dulac | A61J 9/0638 211/100 |
| 2,575,056 A | * | 11/1951 | Jones | A01K 9/00 119/71 |
| 3,224,644 A | * | 12/1965 | Davis | B65D 83/267 248/313 |
| 3,480,244 A | * | 11/1969 | Iversen | A47G 23/0241 248/312 |
| 3,565,384 A | * | 2/1971 | Lockwood | A62C 13/78 248/312 |
| 3,881,677 A | * | 5/1975 | Ihlenfeld | A47C 7/62 248/311.2 |
| D319,383 S | * | 8/1991 | Kihlstrom | D8/349 |
| 5,040,756 A | * | 8/1991 | Via Cava | A61J 15/0011 248/103 |
| 5,681,019 A | * | 10/1997 | Boyce | A01K 9/00 248/103 |
| 6,220,557 B1 | * | 4/2001 | Ziaylek | A62C 13/78 248/154 |
| 2004/0089459 A1 | * | 5/2004 | Folks | A62C 13/78 169/30 |

* cited by examiner

Primary Examiner — Tan Le
(74) Attorney, Agent, or Firm — Holland & Hart LLP

(57) ABSTRACT

A bracket is described for securely storing a bottle is disclosed. The bracket may include a clip configured to receive a neck of the bottle, and a mounting face configured to securely mount the bracket to a vertical mounting surface. In some examples, the mounting surface may further include a base configured to receive a body of the bottle.

13 Claims, 8 Drawing Sheets

BOTTLE STORAGE BRACKET

BACKGROUND

The present invention relates generally to a bottle storage bracket, and more particularly to a system for securely storing bottles, such as wine bottles, on a vertical surface by simple installation means.

Glass bottles may be used for storing a variety of materials and foodstuffs. Though relatively durable under normal circumstances, glass bottles, and wine bottles in particular, may be particularly susceptible to breakage during transport or in certain storage conditions. For example, a large earthquake in California's wine country in recent years resulted in loss of untold numbers of private and retail wine bottles, and their associated retail and ownership values. As the shockwaves reached wine cellars and storage facilities, improperly stored wine bottles became dislodged from their storage spaces or came into contact with one another, shattering the bottles and losing their highly valuable contents. A system is needed for more securely storing bottles to avoid these risks.

SUMMARY

Wine bottle storage may be achieved in numerous ways, from storing bottles vertically or horizontally in groups or individually on shelves, to mounting bottles horizontally at an angle by inserting the neck of the bottle into an angled pocket, among others. Use of wine bottle mounting systems may be used for improved visual access and aesthetic appeal, but typical wine bottle mounting brackets may require access to the rear of the wall or other vertical surface to accommodate installation.

Many secure wine bottle storage systems may avoid contact between adjacent bottles, but may be limited in aesthetic appeal, visual access, and/or ease of installation. For example, crated wine bottles, thoroughly packed with padded shipping materials, may be secure from damage during transport or seismic events, but may also limit visual access to the contents of the crate. Other storage systems, such as wine racks or other vertical storage systems, may also provide some level of security from breakage, but may similarly limit visibility of the label and contents of the bottle. Contrastingly, some wine bottle storage systems, such as wall-mounted units, may place a greater emphasis on aesthetics and visibility, but may lack security from breakage during transport or seismic events. Such display systems may also require reinforced walls or other vertical structures in order to support the weight of the bottles and their contents, and may therefore present challenges in installation. It may be desirable, therefore, to provide a secure, aesthetically pleasing bottle storage means which allows for ease of installation and visual access to the bottles. Accordingly, a bracket is described herein for securely storing a bottle. In one example, the bracket may include a clip configured to receive a neck of the bottle, and a mounting face configured to securely mount the bracket to a vertical mounting surface.

In some examples, the bracket may further include a connector configured to couple the clip with the mounting face. In some examples, the connector may be positioned perpendicular to the mounting face. In some examples, the clip may include an open, semi-circular shape. In some examples, the open, semi-circular shape of the clip may be positioned at a non-parallel angle with respect to the connector. In some examples, the clip may be configured to expand to receive the neck of the bottle and further configured to contract to secure the neck of the bottle. In some examples, the clip may include a plastic material.

In some examples, the bracket may be configured to store the bottle parallel to the vertical mounting surface. In some examples, the bracket may be further configured to store the bottle in any of a horizontal position, or a semi-horizontal position, or a vertical position, or a semi-vertical position with respect to a ground surface.

In some examples, the mounting face may be secured to the vertical mounting surface via one or more fasteners.

In some examples, the mounting face may further include a base configured to receive a body of the bottle. In some examples, the base may include an open, semi-circular shape. In some examples, the base of the body of the bottle may include a larger circumference than a circumference of the neck of the bottle. In some examples, the base may be configured to expand to receive the body of the bottle and may be further configured to contract to secure the body of the bottle. In some examples, the base may include a plastic material. In some examples, the bracket may be configured to store the bottle perpendicular to the vertical mounting surface. In some examples, the bracket may be further configured to store the bottle in a horizontal position.

In some examples, the bottle may be a wine bottle. In some examples, the wine bottle may include a glass material.

The foregoing has outlined broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
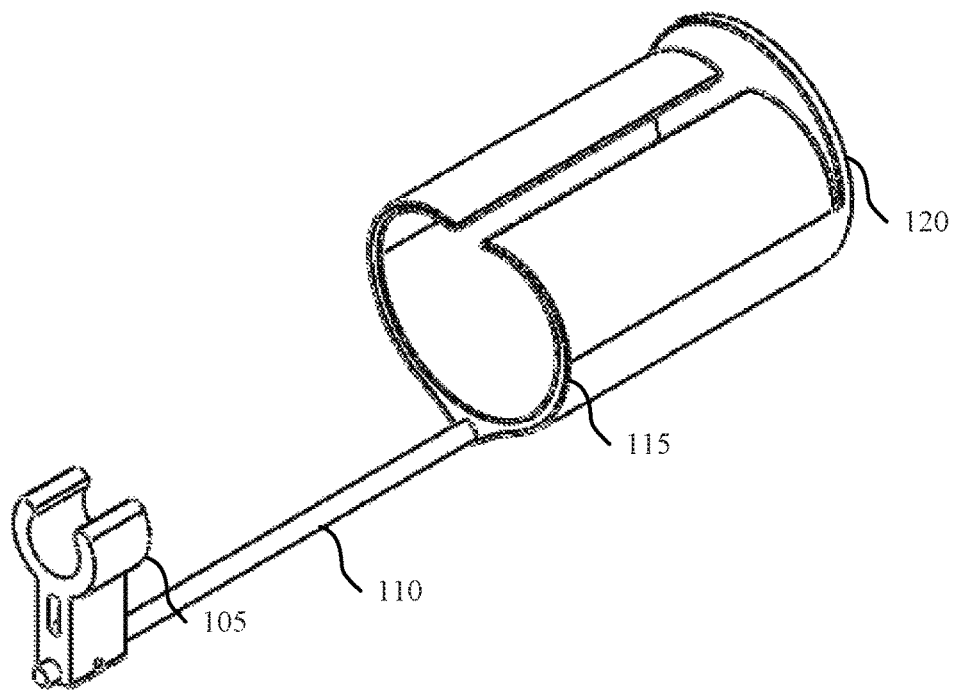
FIG. 1 is a block diagram illustrating a perspective view of a first example of an apparatus according to various embodiments of the invention.

While the embodiments described herein are susceptible to various modifications and alternative forms, specific embodiments have been shown by way of examples in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 is an example of a bottle storage bracket 100 in accordance with various aspects of the disclosure. In some embodiments, the bottle storage bracket 100 may include any of a clip 105, a connector 110, a base 115, and/or a mounting face 120. In the illustrated example, bottle storage bracket 100 may be configured to mount to a vertical mounting face, such as a wall or cabinet, and secure a bottle, such as a wine bottle, in a "neck out" configuration. For example, a wine bottle may be positioned in bottle storage bracket 100 such that the neck of the wine bottle may be secured by clip 105 and the body of the wine bottle may be secured by base 115. Mounting face 120 may couple bottle storage bracket 100 to a vertical mounting face, for example using one or more connection means, such as screws. Connector 110 may removably connect clip 105 with base 115 in order to better secure the wine bottle mounted in bottle storage bracket 100.

As illustrated in FIG. 1, connector 110 may be positioned on a same plane as the lower surface of base 115, and may extend perpendicularly from mounting face 120 to couple clip 105 with base 115. Connector 110 may be formed of a rigid or semi-rigid material, such as a metal or plastic.

Clip 105 and base 115 may each be formed in an open, semi-circular shape, in order to facilitate ease of insertion and removal of a wine bottle into and out of the bottle storage bracket 100. This ease of insertion and removal may be further facilitated by forming one or both of clip 105 and base 115 from a molded plastic material, where the plastic material may provide a measure of give or flex. For example, a wine bottle may first be inserted by "snapping" the neck of the wine bottle into clip 105, for example by pushing the neck of the wine bottle in a downward motion between the opposing semi-circular portions of clip 105. The opposing semi-circular portions of clip 105 may expand slightly to accommodate the neck of the wine bottle as it is pushed into clip 105. In some examples, the clip 105 may be detached from the connector 110 and base 115 at the time of inserting the wine bottle neck into clip 105. The next step, then, may be aligning connector 110 with clip 105, and inserting the connector into clip 105 while at the same time inserting the body of the wine bottle into the opening formed by the open, semi-circular shape of base 115. The opposing semi-circular portions of base 115 may expand slightly to accommodate the width of the body of the wine bottle.

Removal of the wine bottle from bottle storage bracket 100 may be achieved in an opposite manner, where the body of the wine bottle may be pulled out of base 115, such that the opposing semi-circular portions of base 115 expand slightly to release the body of the wine bottle. As the wine bottle is pulled out of base 115, clip 105 may similarly release from connector 110. At this point, the wine bottle may be release from base 115 and connector 110, but may still be connected to clip 105. In the next step, the neck of the wine bottle may be gently but firmly pulled out of clip 105, such that the opposing semi-circular portions of clip 105 may expand slightly to release the neck of the wine bottle. The clip 105 may then be realigned with connector 110, and connector 110 may be inserted into clip 105 for storage purposes.

According to this configuration, the wine bottle may be firmly secured in bottle storage bracket 100, with the neck of the bottle extending perpendicularly out from the vertical mounting surface. This configuration may be particularly beneficial for storing and securing a plurality of wine bottles, where a plurality of bottle storage brackets 100 may be secured to the vertical mounting surface in any desired grid, stripe, or novelty pattern (e.g., chevron, sinusoidal, circular, alphanumeric, etc.). In the event of a seismic event, the wine bottles secured in bottle storage bracket 100 may neither come into contact with one another, nor release from the bottle storage bracket 100. In this way, secure storage of multiple wine bottles, with low cost and ease of installation, may be achieved.

Figure 2:
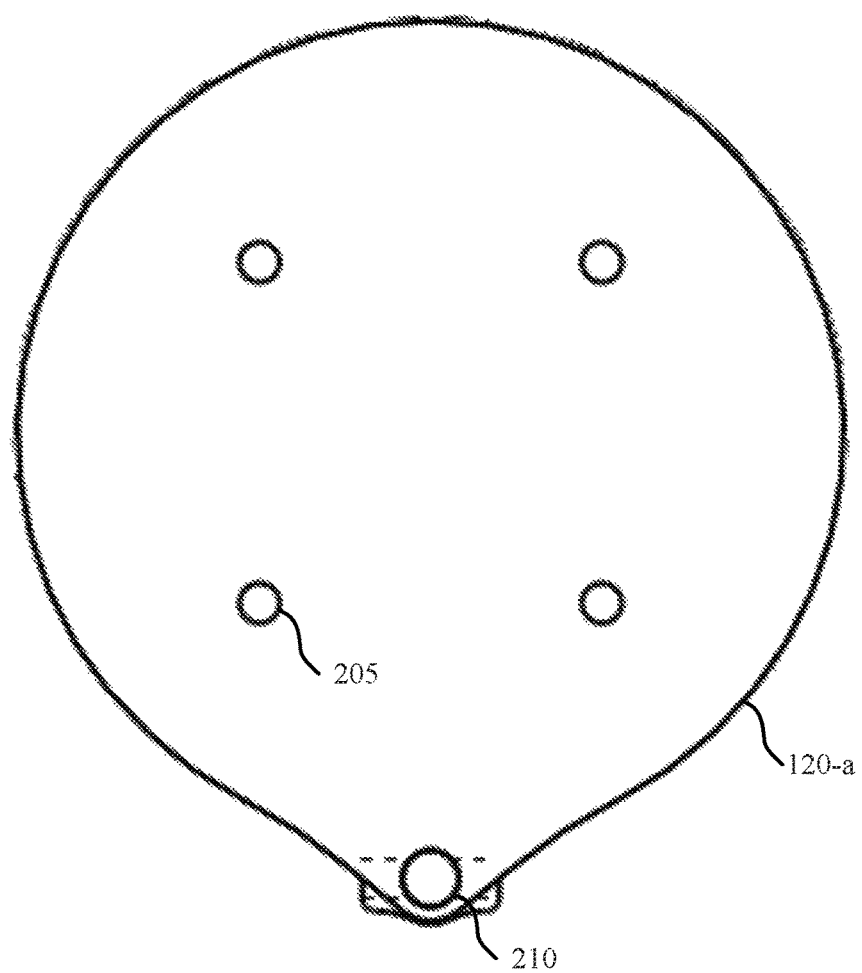
FIG. 2 is a block diagram illustrating a rear view of a first example of an apparatus according to various embodiments of the invention.

FIG. 2 is an example of a bottle storage bracket 200 in accordance with various aspects of the disclosure, as seen from a rear view. Bottle storage bracket 200 may be an example of bottle storage bracket 100 as described with reference to FIG. 1. Bottle storage bracket 200 may include any of mounting face 120-a, connection means 205, and connector base 210. Mounting face 120-a may be an example of mounting face 120 as described in more detail with reference to FIG. 1. Connection means 205 may be any one or more means for securing bottle storage bracket 200 to a vertical mounting surface, such as a wall or cabinet. For example, connection means 205 may include a plurality of holes through which a screw or other connector may be inserted to secure mounting face 120-a to the vertical mounting surface. Connector base 210 may function to connect connector 110 with base 115 as described in more detail with reference to FIG. 1.

In the illustrated example of bottle storage bracket 200, mounting face 120-*a*, connection means 205, and connector base 210 are each illustrated having a circular configuration. In other examples, alternate configurations are envisioned, such as square or otherwise shaped configurations.

Figure 3:
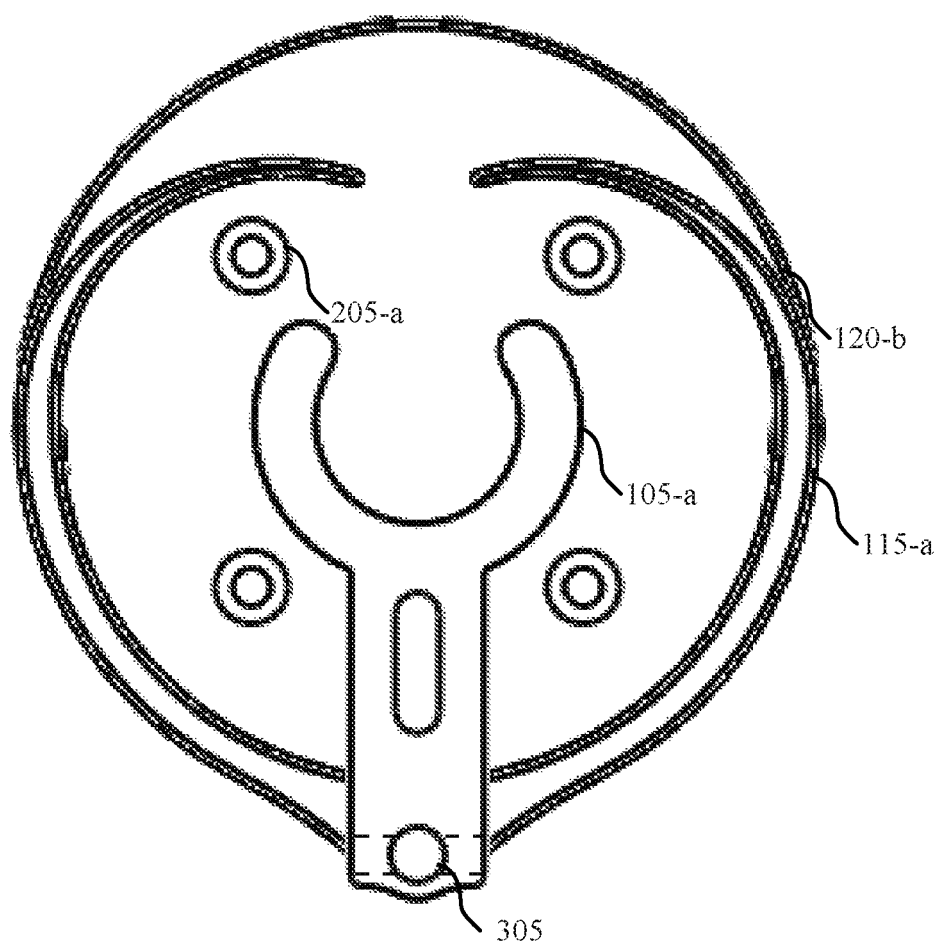
FIG. 3 is a block diagram illustrating a front view of a first example of an apparatus according to various embodiments of the invention.

FIG. 3 is an example of a bottle storage bracket 300 in accordance with various aspects of the disclosure, as seen from a front view. Bottle storage bracket 300 may be an example of bottle storage bracket 100 or 200 as described with reference to FIGS. 1 and 2. Bottle storage bracket 300 may include any of clip 105-*a*, base 115-*a*, mounting face 120-*b*, connection means 205-*a*, and/or connector base 305. Clip 105-*a* may be an example of clip 105 described with reference to FIG. 1; base 115-*a* may be an example of base 115 described with reference to FIG. 1; mounting face 120-*b* may be an example of mounting face 120, 120-*a* described with reference to FIGS. 1 and 2; and connection means 205-*a* may be an example of connection means 205 described with reference to FIG. 2.

As illustrated in FIG. 3, bottle storage bracket 300 may accommodate secure bottle storage by receiving the neck of a wine bottle in clip 105-*a*, and the base of the wine bottle in base 115-*a*. The bottle storage bracket 300 may be secured to a vertical surface by inserting, for example, screws or other securing means into connection means 205-*a*, in order to couple mounting face 120-*b* with a wall or other vertical surface. Connector base 305 may secure a connector (not shown) between clip 105-*a* and base 115-*a*, for added stability.

Figure 4:
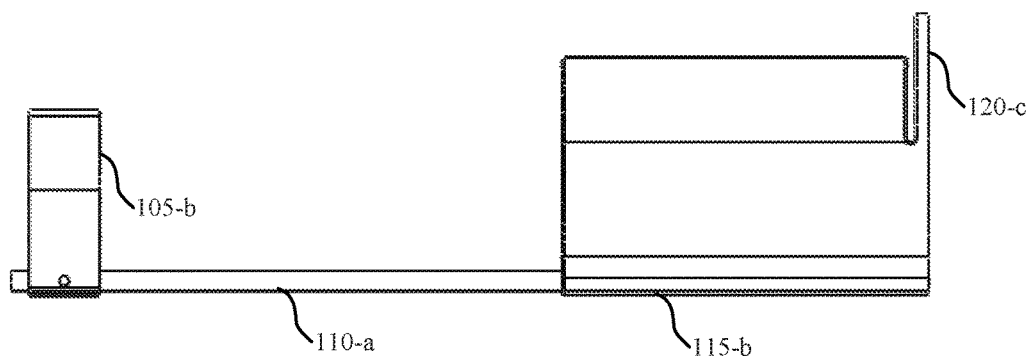
FIG. 4 is a block diagram illustrating a side view of a first example of an apparatus according to various embodiments of the invention.

FIG. 4 is an example of a bottle storage bracket 400 in accordance with various aspects of the disclosure, as seen from a side view. Bottle storage bracket 400 may be an example of bottle storage bracket 100, 200, 300 as described with reference to FIGS. 1-3. Bottle storage bracket 400 may include any of clip 105-*b*, connector 110-*a*, base 115-*b*, and/or mounting face 120-*c*. Clip 105-*b* may be an example of clip 105 described with reference to FIG. 1; connector 110-*a* may be an example of connector 110 described with reference to FIG. 1; base 115-*b* may be an example of base 115, 115-*a* described with reference to FIGS. 1 and 3; and mounting face 120-*c* may be an example of mounting face 120, 120-*a* described with reference to FIGS. 1-3.

As illustrated in FIG. 4, bottle storage bracket 400 may accommodate secure bottle storage by receiving the neck of a wine bottle in clip 105-*b*, and the base of the wine bottle in base 115-*b*. The bottle storage bracket 400 may be secured to a vertical surface by coupling mounting face 120-*c* with a wall or other vertical surface. Connector 110-*a* may secure clip 105-*b* with base 115-*b*, for added stability.

Figure 5:
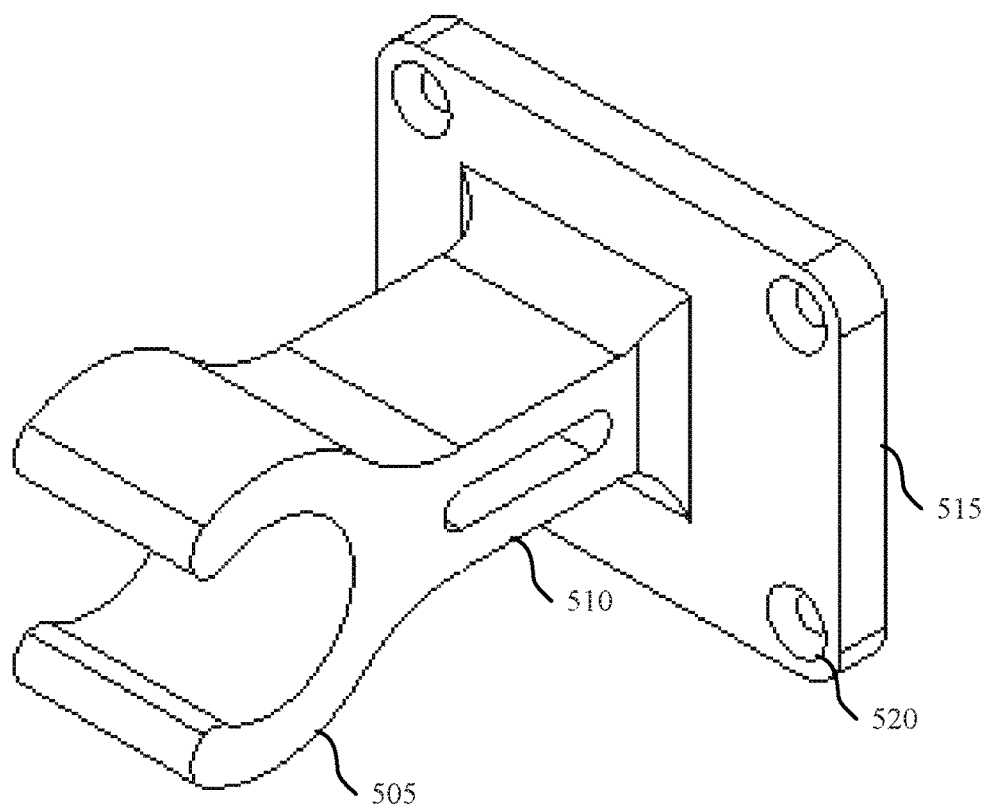
FIG. 5 is a block diagram illustrating a first perspective view of a second example of an apparatus according to various embodiments of the invention.

FIG. 5 is an example of a bottle storage bracket 500 in accordance with various aspects of the disclosure, as seen from a perspective view. As shown, bottle storage bracket 500 illustrates a second configuration for secure bottle storage. In the illustrated example, bottle storage bracket 500 facilitates a "label out" storage configuration, in which the bottle may be stored parallel to a vertical mounting surface, as opposed to the perpendicular, "neck out" configuration illustrated in FIGS. 1-4. Bottle storage bracket 600 may include any of clip 505, connector 510, mounting face 515, and/or connection means 520.

Clip 505 may be similar to clip 105, 105-*a*, 105-*b* as described with respect to FIGS. 1, 3, and 4. In particular, clip 505 may be formed in an open, semi-circular shape, in order to facilitate ease of insertion and removal of a wine bottle into and out of the bottle storage bracket 500. This ease of insertion and removal may be further facilitated by forming one or both of clip 105 and connector 510 from a molded plastic material, where the plastic material may provide a measure of give or flex. In some examples, clip 505 and connector 510 may be formed of a single piece of molded plastic or other flexible or semi-flexible material.

Clip 505 may facilitate secure storage of a bottle in a configuration parallel to a vertical mounting surface. For example, a wine bottle may be "snapped" into clip 505, for example by pushing the neck of the wine bottle in an inward motion between the opposing semi-circular portions of clip 505. The opposing semi-circular portions of clip 505 may expand slightly to accommodate the neck of the wine bottle as it is pushed into clip 505.

Mounting face 515 may couple bottle storage bracket 500 to a vertical mounting face, for example using one or more connection means 520, such as screws. According to this configuration, the wine bottle may be firmly secured in bottle storage bracket 500, where the bottle may extend at any angle parallel to the vertical mounting surface. For example, the bottle may be secured parallel to the vertical mounting surface and at an angle parallel to the horizontal ground or floor, or may be stored at an angle different from a horizontal surface, such as directly vertical or anywhere there-between. This configuration may be particularly beneficial for storing and securing a plurality of wine bottles, where a plurality of bottle storage brackets 500 may be secured to the vertical mounting surface in any desired grid, stripe, or novelty pattern (e.g., chevron, sinusoidal, circular, alphanumeric, etc.). In the event of a seismic event, the wine bottles secured in bottle storage bracket 500 may neither come into contact with one another, nor release from the bottle storage bracket 500. In this way, secure storage of multiple wine bottles, with low cost and ease of installation, may be achieved. Additionally, the configuration illustrated in FIG. 5 may allow for easy visual access to the label or other identifier on the bottles, for convenience and aesthetic appeal.

Figure 6:
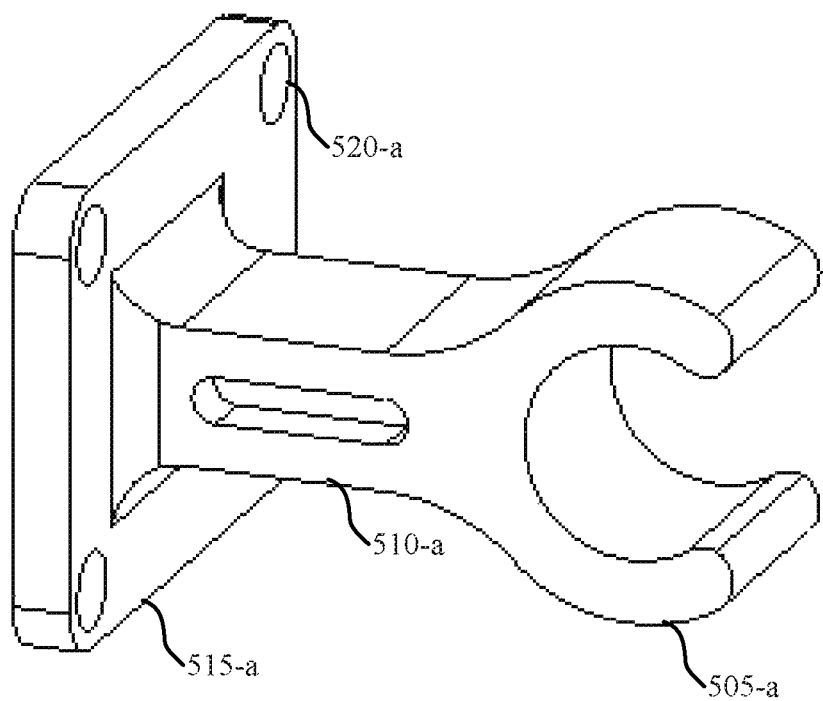
FIG. 6 is a block diagram illustrating a second perspective view of a second example of an apparatus according to various embodiments of the invention.

FIG. 6 is an example of a bottle storage bracket 600 in accordance with various aspects of the disclosure, as seen from an alternate perspective view. As shown, bottle storage bracket 600 illustrates the second configuration for secure bottle storage. In the illustrated example, bottle storage bracket 600 facilitates a "label out" storage configuration, in which the bottle may be stored parallel to a vertical mounting surface. Bottle storage bracket 600 may include any of clip 505-*a*, connector 510-*a*, mounting face 515-*a*, and/or connection means 520-*a*, which may be examples of clip 505, connector 510, mounting face 515, and connection means 520 as illustrated in FIG. 5.

As illustrated in FIG. 6, bottle storage bracket 600 may securely store a bottle in a "label out" configuration, in which the bottle may be stored parallel to a vertical mounting surface to which bottle storage bracket 600 is coupled.

Figure 7:
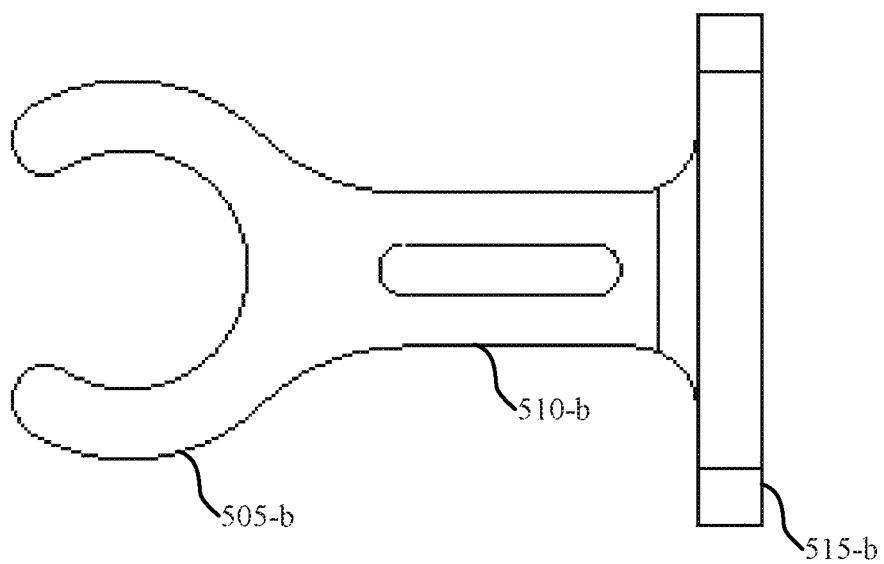
FIG. 7 is a block diagram illustrating a front view of a second example of an apparatus according to various embodiments of the invention.

FIG. 7 is an example of a bottle storage bracket 700 in accordance with various aspects of the disclosure, as seen from a side view. Bottle storage bracket 700 may be an example of bottle storage bracket 500 or 600 as described with reference to FIGS. 5 and 6. Bottle storage bracket 700 may include any of clip 505-*b*, connector 510-*b*, and/or mounting face 515-*b*, which may be examples of clip 505, 505-*a*, connector 510, 510-*a*, and mounting face 515, 515-*a* described with reference to FIGS. 5 and 6.

As illustrated in FIG. 7, bottle storage bracket 700 may accommodate secure bottle storage by receiving the neck of a wine bottle in clip 505-*b*. The bottle storage bracket 700 may be secured to a vertical surface by coupling mounting face 515-*b* with a wall or other vertical surface. Connector 510-*b* may secure clip 505-*b* with mounting face 515-*b*.

Figure 8:
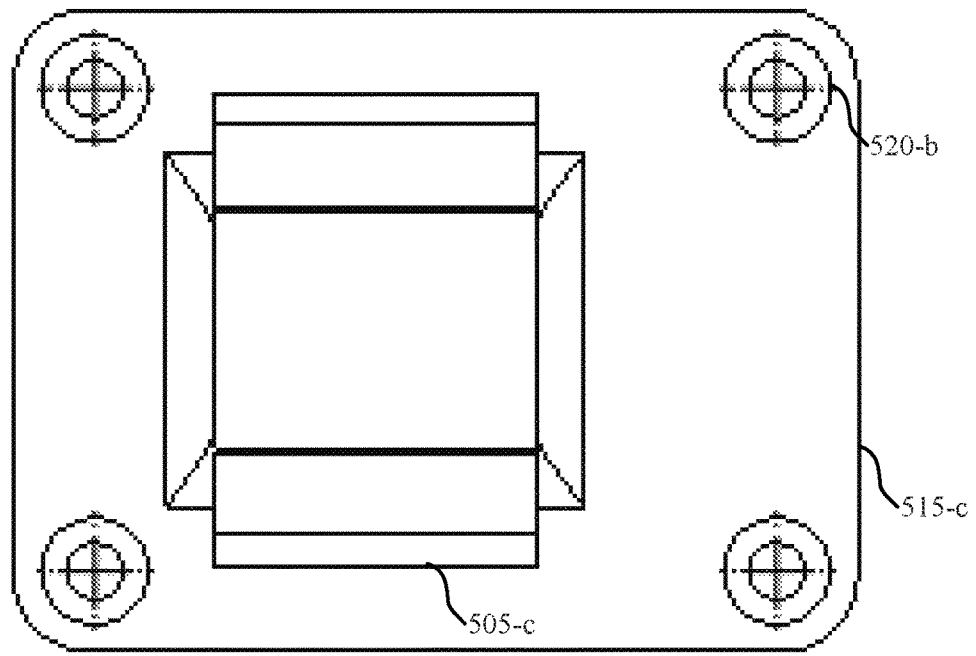
FIG. 8 is a block diagram illustrating side view of a second example of an apparatus according to various embodiments of the invention.

FIG. 8 is an example of a bottle storage bracket 800 in accordance with various aspects of the disclosure, as seen from a front view. Bottle storage bracket 800 may be an example of bottle storage bracket 400, 500, 600, 700 as described with reference to FIGS. 4-7. Bottle storage bracket 300 may include any of clip 505-*c*, mounting face 515-*c*, and/or connection means 520-*b*, which may be examples of clip 505, 505-*a*, 505-*b*, mounting face 515, 515-*a*, 515-*b*, and connection means 520, 520-*a* described with reference to FIGS. 4-7.

As illustrated in FIG. 8, bottle storage bracket 800 may accommodate secure bottle storage by receiving the neck of a wine bottle in clip 505-*c*. The bottle storage bracket 800 may be secured to a vertical surface by inserting, for example, screws or other securing means into connection means 520-*b*, in order to couple mounting face 515-*c* with a wall or other vertical surface.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A bracket for securely storing a bottle, comprising:
   a clip comprising a flexible enclosure configured to receive a neck of the bottle;
   a connector coupled with the clip, wherein the clip is configured to be detached from the connector to receive the neck of the bottle;
   a base coupled with the connector, the base comprising a flexible semi-circular enclosure that includes a linear opening that is configured to receive a body of the bottle; and
   a mounting face configured to securely mount the bracket flush with a vertical mounting surface and configured to receive an entire bottom surface of the bottle, wherein the bottom surface is oriented orthogonal to the vertical mounting surface and configured to be secured to the vertical mounting surface via a plurality of connection points.

2. The bracket of claim 1, wherein the connector is positioned perpendicular to the mounting face.

3. The bracket of claim 1, wherein the open, semi-circular shape of the clip is positioned at a non-parallel angle with respect to the connector.

4. The bracket of claim 1, wherein the clip is configured to expand to receive the neck of the bottle and further configured to contract to secure the neck of the bottle.

5. The bracket of claim 4, wherein the clip comprises a plastic material.

6. The bracket of claim 1, wherein the bracket is further configured to store the bottle in any of a horizontal position, or a semi-horizontal position with respect to a ground surface.

7. The bracket of claim 1, wherein the mounting face is secured to the vertical mounting surface via one or more fasteners.

8. The bracket of claim 1, wherein the base of the body of the bottle comprises a larger circumference than a circumference of the neck of the bottle.

9. The bracket of claim 1, wherein the flexible enclosure of the base is configured to expand to receive the body of the bottle and further configured to contract to secure the body of the bottle.

10. The bracket of claim 9, wherein the base comprises a plastic material.

11. The bracket of claim 1, wherein the bracket is further configured to store the bottle in a horizontal position.

12. The bracket of claim 1, wherein the bottle is a wine bottle.

13. The bracket of claim 12, wherein the wine bottle comprises a glass material.

* * * * *